United States Patent
Stephenson et al.

(10) Patent No.: US 12,017,204 B2
(45) Date of Patent: *Jun. 25, 2024

(54) SUPERIOR CORE-IN-SHELL COMPONENT COMPOSITE ADSORBENTS FOR VSA/VPSA/PSA SYSTEMS

(71) Applicant: PRAXAIR TECHNOLOGY, INC., Danbury, CT (US)

(72) Inventors: Neil A. Stephenson, E. Amherst, NY (US); Philip A. Barrett, Tonawanda, NY (US); Steven J. Pontonio, Eden, NY (US); Nicholas R. Stuckert, Grand Island, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 937 days.

This patent is subject to a terminal disclaimer.

(21) Appl. No.: 16/966,092

(22) PCT Filed: Feb. 14, 2019

(86) PCT No.: PCT/US2019/018041
§ 371 (c)(1),
(2) Date: Jul. 30, 2020

(87) PCT Pub. No.: WO2019/161077
PCT Pub. Date: Aug. 22, 2019

(65) Prior Publication Data
US 2021/0031171 A1    Feb. 4, 2021

Related U.S. Application Data

(60) Provisional application No. 62/630,897, filed on Feb. 15, 2018.

(51) Int. Cl.
*B01D 53/047*    (2006.01)
*B01J 20/18*    (2006.01)
(Continued)

(52) U.S. Cl.
CPC ..... *B01J 20/28011* (2013.01); *B01D 53/0476* (2013.01); *B01J 20/18* (2013.01);
(Continued)

(58) Field of Classification Search
CPC ...... B01J 20/28011; B01J 20/18; B01J 20/20; B01J 20/28004; B01J 20/28016;
(Continued)

(56) References Cited

U.S. PATENT DOCUMENTS

| | | | |
|---|---|---|---|
| 4,921,831 A | 5/1990 | Nakai et al. | |
| 5,236,688 A | 8/1993 | Watanabe et al. | |

(Continued)

FOREIGN PATENT DOCUMENTS

| | | |
|---|---|---|
| DE | 19826209 A1 | 12/1999 |
| EP | 0282053 A2 | 9/1988 |

(Continued)

OTHER PUBLICATIONS

Internet document "Table of specific heat capacities," https://en.wikipedia.org/wiki/Table_of_specific_heat_capacities (2023).*

(Continued)

*Primary Examiner* — Frank M Lawrence, Jr.
(74) *Attorney, Agent, or Firm* — Ralph J. Mancini

(57) ABSTRACT

The invention relates to a superior core-in-shell adsorbent comprising adsorbent, and an inert core, wherein said core possesses a porosity less than 10%, and has a volumetric thermal capacity greater than 1 J/K*cc. The adsorbents of the invention possess good physical strength, and allow a longer cycle time, thereby reducing the blowdown (vent) losses compared to known adsorbents.

Figure 1:
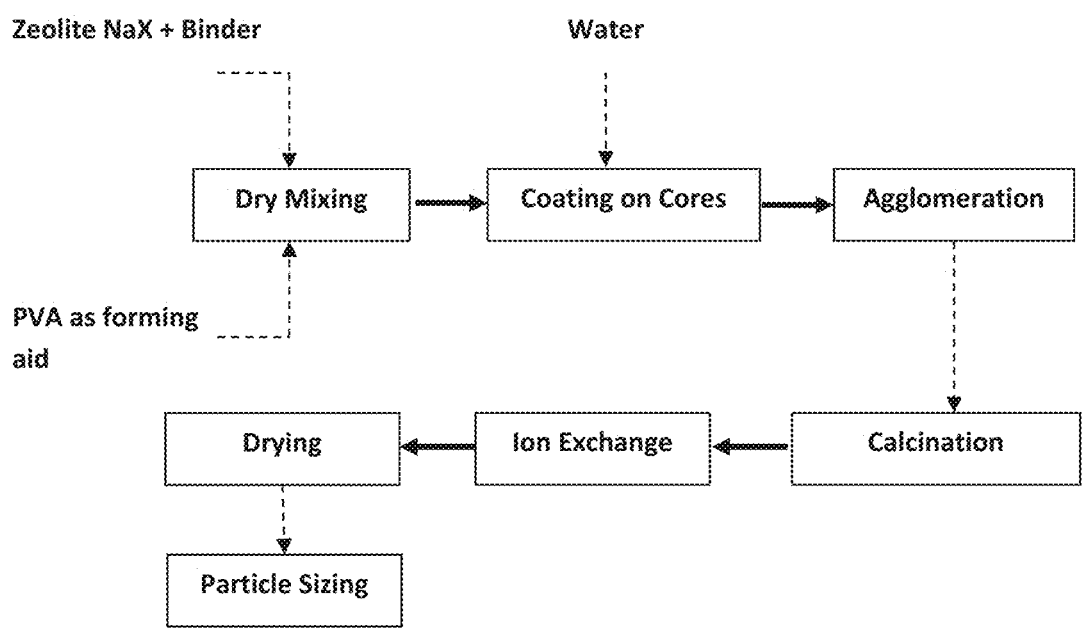

The invention relates to an adsorber design for a vacuum/pressure swing adsorption (VSA, VPSA, PSA) process designed to obtain oxygen product from air utilizing the adsorbents of the invention.

17 Claims, 7 Drawing Sheets

(51) Int. Cl.
*B01J 20/20* (2006.01)
*B01J 20/28* (2006.01)
*B01J 20/30* (2006.01)
*B01J 20/32* (2006.01)

(52) U.S. Cl.
CPC ......... *B01J 20/20* (2013.01); *B01J 20/28004* (2013.01); *B01J 20/28016* (2013.01); *B01J 20/28019* (2013.01); *B01J 20/2803* (2013.01); *B01J 20/3028* (2013.01); *B01J 20/3204* (2013.01); *B01J 20/324* (2013.01); *B01J 20/3293* (2013.01); *B01D 2253/102* (2013.01); *B01D 2253/1085* (2013.01); *B01D 2253/116* (2013.01); *B01D 2253/25* (2013.01); *B01D 2253/304* (2013.01); *B01D 2253/311* (2013.01); *B01D 2256/10* (2013.01); *B01D 2256/16* (2013.01); *B01D 2257/104* (2013.01); *B01D 2257/404* (2013.01); *B01D 2257/504* (2013.01); *B01D 2257/702* (2013.01)

(58) Field of Classification Search
CPC .............. B01J 20/28019; B01J 20/2803; B01J 20/3028; B01J 20/3204; B01J 20/324; B01J 20/3293; B01J 20/3238; B01J 20/24; B01J 20/28; B01D 53/0476; B01D 53/04; B01D 2253/102; B01D 2253/1085; B01D 2253/116; B01D 2253/25; B01D 2253/304; B01D 2253/311; B01D 2256/10; B01D 2256/16; B01D 2257/104; B01D 2257/404; B01D 2257/504; B01D 2257/702; B01D 2253/30; B01D 2257/7025; B01D 2258/06; B01D 53/02; B01D 53/047; Y02C 20/20; Y02C 20/40
USPC ........ 95/96, 130; 96/108; 501/400, 401, 416
See application file for complete search history.

(56) References Cited

U.S. PATENT DOCUMENTS

| | | | |
|---|---|---|---|
| 6,277,179 | B1 | 8/2001 | Reymonet |
| 6,284,021 | B1* | 9/2001 | Lu ........................ B01J 20/3483 95/114 |
| 6,500,234 | B1 | 12/2002 | Ackley et al. |
| 6,503,299 | B2 | 1/2003 | Baksh et al. |
| 8,814,985 | B2 | 8/2014 | Gerds et al. |
| 10,646,816 | B2* | 5/2020 | Zheng ..................... B01J 20/08 |
| 2002/0103074 | A1* | 8/2002 | Wheelock ........... B01J 20/3236 502/340 |
| 2005/0250641 | A1* | 11/2005 | Jolimaitre ........... B01J 20/3078 502/64 |
| 2012/0152115 | A1* | 6/2012 | Gerds ..................... B01J 20/12 96/132 |
| 2013/0196061 | A1 | 8/2013 | Hull |
| 2016/0175759 | A1* | 6/2016 | Carstensen .......... B01D 53/047 502/67 |
| 2017/0203346 | A1 | 7/2017 | Hull |
| 2017/0247772 | A1 | 8/2017 | Hull |
| 2019/0232212 | A1* | 8/2019 | Rangnekar .......... B01D 53/047 |
| 2020/0368724 | A1* | 11/2020 | Stephenson .......... B01J 20/3238 |

FOREIGN PATENT DOCUMENTS

| | | | | |
|---|---|---|---|---|
| EP | 1080771 | A1 | 3/2001 | |
| EP | 2198946 | A1 | 6/2010 | |
| FR | 2794993 | A1 * | 12/2000 | ............. B01D 53/02 |
| GB | 1398466 | A | 6/1975 | |
| WO | 2008109882 | A2 | 9/2008 | |

OTHER PUBLICATIONS

Machine-generated English translation of FR2794993 A1, published Dec. 2000.*

* cited by examiner

Rate as experimentally determined

Rate as ideally predicted

SUPERIOR CORE-IN-SHELL COMPONENT COMPOSITE ADSORBENTS FOR VSA/VPSA/PSA SYSTEMS

RELATED APPLICATIONS

This application claims the benefit of International Application No. PCT/US2019/018041, filed on Feb. 14, 2019 which claimed the benefit of U.S. Provisional Application Ser. No. 62/630,897, filed on Feb. 15, 2018, which are incorporated herein by reference.

FIELD OF THE INVENTION

The present invention generally relates to a method of making of superior core-in-shell composite adsorbents and to core-in-shell composite adsorbents made by said method. The adsorbents of the invention are characterized by: (1) a non-adsorbing inert core material, with porosity of less than 10%, preferably less than 5%; (2) a total volume occupied by such core in a range of from about 5-20%, in another embodiment 8-15% and (3) a volumetric heat capacity greater than zeolite molecular sieve; wherein the active shell is a zeolite with a binding agent and wherein the average product size ranges from about 0.4-2.5 mm, in another embodiment 1.0-1.5 mm.

Preferred compositions have acceptable physical strength while exhibiting high performance in bulk gas separation. These are adsorbent shell on inert cores, wherein the adsorbent shell content ranges from 60-95% vol and the overall core content ranges from 5-40% vol.

The composites of the invention are ideally suited for $O_2$ vacuum and/or pressure swing adsorption (VSA, VPSA, PSA), Syngas $H_2O$ and $CO_2$ removal PSA/VSA/VPSA, and Hydrogen purification PSA/VSA/VPSA processes.

BACKGROUND OF THE INVENTION

Adsorption processes such as pressure swing adsorption (PSA), vacuum swing adsorption (VSA) and vacuum pressure swing (VPSA) have been commercially utilized for bulk air separation, as well as trace air contaminant removal, for a few decades. In PSA and VPSA processes, compressed air is pumped through a fixed bed of an adsorbent exhibiting an adsorptive preference for one of the main constituents, typically $N_2$ in bulk air separation, $CO_2$ and $H_2O$ in air prepurification, etc., whereby an effluent product stream enriched in the lesser-adsorbed constituent is obtained. Improvements in these processes remain important goals, one principal means of which is the discovery and development of better adsorbents. Significant improvements have been achieved in not only adsorption selectivity and capacity, but also in unique ways to enhance the adsorption mass-transfer rate. With a fast mass transfer rate, one can reduce the cycle time and, in turn, lower the power consumption and increase the adsorbent productivity in PSA/VPSA systems and processes.

One strategy to increase the mass transfer rate of an agglomerated adsorbent particle is to reduce the particle size of adsorbent aggregates. This increases the adsorption/desorption kinetics by reducing the path length needed for adsorbates to travel through the rate-limiting macropores of the agglomerated adsorbent. Reducing the particle size, however, has its limitations: higher pressure drop and increased risk of fluidization in unconstrained adsorption beds quickly become issues for adsorption process and system designs. Moreover, containment and manufacturing of small particle sized agglomerates represent other drawbacks that need to be resolved.

Oxygen production can be produced industrially via two methods, cryogenic distillation or pressure swing adsorption (including vacuum). The present invention relates to PSA systems which typically are more cost advantageous for smaller plants (<800 TPD of $O_2$). Typically, most plants are less than 250 TPD of $O_2$. Production of Oxygen typically is done through adsorption of nitrogen. A feed gas (usually consisting of $N_2$ and $O_2$) is compressed (in the case of a PSA) and fed to an adsorbent bed. The increased pressure allows the adsorbent to selectively uptake nitrogen and oxygen migrates to the product end of the bed at higher $O_2$ purity than the feed gas. The adsorbent bed is then regenerated by venting the bed (or pulling a vacuum in the case of VSA or VPSA) whereby the adsorbed $N_2$ desorbs and is released into the atmosphere. The removal of water and trace amounts of CO2 from various gas mixtures is the subject of much prior art. A vast majority of the prior art deals with the pre-purification of air prior to cryogenic distillation. Both pressure swing adsorption (PSA) and thermal swing adsorption (TSA) processes are taught.

U.S. Pat. No. 4,249,915 discloses a process where moisture and carbon dioxide are removed from atmospheric air by adsorption in separate beds. The moisture removal bed (filled with a solid adsorbent effective in the adsorption of water) is regenerated by pressure swing adsorption in a relatively short operating cycle, while the carbon dioxide laden bed (filled with an adsorbent effective in the retention of carbon dioxide) is regenerated thermally at considerably longer time intervals.

U.S. Pat. No. 5,897,686 discloses a process where moisture and carbon dioxide are removed from synthesis gas by adsorption in a combined PSA process.

The need for high purity (>99.9%) hydrogen is growing in the chemical process industries, e.g., in steel annealing, silicon manufacturing, hydrogenation of fats and oils, glass making, hydrocracking, methanol production, the production of oxo alcohols, and isomerization processes. This growing demand requires the development of highly efficient separation processes for H2 production from various feed mixtures. In order to obtain highly efficient PSA separation processes, both the capital and operating costs of the PSA system must be reduced.

One way of reducing PSA system cost is to decrease the adsorbent inventory and number of beds in the PSA process. In addition, further improvements may be possible using advanced cycles and adsorbents in the PSA process. However, H2 feed gas contains several contaminants, e.g. a feed stream may contain CO2 (20% to 25%) and minor amounts of H2O (<0.5%), CH4 (<3%), CO (<1%) and N2 (<1%). Such a combination of adsorbates at such widely varying compositions presents a significant challenge to efficient adsorbent selection, adsorbent configuration in the adsorber, and the choices of individual adsorbent layers and multiple adsorbent bed systems to obtain an efficient H2-PSA process.

U.S. Pat. No. 6,503,299 discloses the improved recovery of a hydrogen PSA by the addition of CaX to the adsorbent bed.

One way to lower the power requirement and increase production of any PSA process is to reduce the blowdown or bed switch loss described previously. This can be accomplished by reducing the frequency of bed blowdown and repressurization, i.e., by extending the cycle time for which the bed is kept online prior to being switched to regeneration. However, since the commercial adsorbents as described in the prior arts, afford only modest dynamic capacities for removal of the contaminants, an increase in cycle time would require either reducing the feed flow significantly at a fixed bed size, or require a drastic increase in the bed size at a fixed feed flow rate. The state of the are adsorbent for O2-VPSA systems is lithium exchanged zeolite X where the SiO2/Al2O3 ratio is 2, commonly referred to as LiX.

EP 1,080,771 describes a core-shell composite adsorbent with an inner core comprising a non-porous and non-adsorbent material and at least one outer layer comprising an adsorbent material. Such composite beads can be used to improve the mass transfer in adsorption processes without reducing the particle size of the beads. Composite beads with a non-porous core have a lower active adsorbent content in comparison to homogeneous adsorbent beads therefore resulting in lower overall capacity, which however is offset by the improved mass transfer rate. In order to form such composite with acceptable crush strength, extra amount of inorganic binder material would need to be added, which would further reduce the overall adsorption capacity and consequently resulting in negative impact on the performance of such composite adsorbent. Without providing specific examples disclosing either the core characteristics and/or particle size distribution of such composite, or even the detailed bead forming process, the inventors subsequently compared, in U.S. Pat. No. 6,284,021, 4 mm diameter composite beads with 2 mm diameter conventional (LiX) adsorbent beads for oxygen VPSA application, showing a conceptual 14% performance advantage for the core-shell adsorbent.

Gerds et al. in EP 2,198,946 and U.S. Pat. No. 8,814,985 disclose making of core-shell composite adsorbent beads having a porous and non-adsorbent core and a porous and adsorbent shell, claiming that the porous core enabled improved bead strength with even less inorganic binding agent, and therefore higher overall adsorption capacity. The beads preferably are manufactured by calcining together a non-sintered core and the adsorbent layer, with addition of inorganic binder (kaolin clay) as well as organic forming aids (e.g., polyvinyl alcohol, glycerin, and polysiloxane etc.). The bead forming itself was described to be achieved using a Rotor Coater, spray coating desired zeolite suspension onto the pre-formed cores (with multiple stages of heat treatment required), a complicated method more suitable for pharmaceutical (drug pills) and rather rarely used for industrial scale adsorbent manufacturing due to cost. Two types of sieves, 5A and LiX, were targeted to be coated on preformed porous clay cores, for $H_2$ PSA and VPSA applications respectively. For LiX, a core of 1.4 mm diameter was used to grow and eventually match a homogeneous 2.0 mm commercial product. As expected, the overall adsorption capacity, measured with $N_2$ at 40° C. and 101 kPa, was reduced to less than half, while the mass transfer coefficient was improved more than double that of the homogeneous material. In order to compare their actual VPSA performances though, the core-shell LiX beads were not tested alone, rather with a layer of 50 vol % homogeneous LiX followed by second layer of 50 vol % solid core composite LiX. As compared to the homogeneous LiX beads layer only in the VPSA system, the multi-layer system showed advantages in terms of higher product oxygen flow and higher recovery. The improvement was credited to the higher mass transfer rate and lower pressure drop due to the presence of the core-shell composite. In the article "Novel zeolite composites and consequences for rapid sorption Processes", Adsorption (2007) 13: 267-279, Brandt et al. disclose the proof of concept as described in U.S. Pat. No. 6,284,021. Their method contains single core that is approximately 50% or more by volume of the final composite. The preferred adsorbent type is activated alumina, Zeolites, mesopore-structured materials and mixtures of these. The preferred core type is non-porous and is selected from the group consisting of metals, metal oxides, mixed oxides, dense ceramic oxides such as cordierite, perovskite, etc., sintered clays such as kaolin, attapulgite, etc., silicas, aluminas, silica-alumina, silica-magnesia, silica-Zirconia, silica-thoria, silica-beryllia, and silica-titania, as well as ternary compositions, such as silica-alumina-thoria, silica alumina-Zirconia, and mixtures of these. Typical improvements to adsorbent performance in the adsorbent field have an improved volumetric performance. However Brandt et al. found that all the adsorbents under the disclosed invention have lower volumetric performance. From a commercial economic standpoint, these adsorbents have little benefit to offer, as they require more steps to produce in addition to lowering the overall production of an equivalent size commercial system.

This present invention is directed to a unique core-in-shell composite that exhibits higher adsorption performance while maintaining good physical strength. With the preferred non-porous cores, a surprising range of active shell layering, comprising LiX zeolite and suitable amount of inorganic binder, was found to achieve preferred performing core-in-shell beads compared to commercial LiX, specifically for $O_2$ VPSA/VSA/PSA applications. The adsorbent compositions and adsorber designs of the invention offer significantly improved working capacity compared to adsorbents with and without a core of the prior art. This is also true for other adsorbent coatings described herein. These performance improvements have been realized by uniquely introducing a core-in-shell composite wherein the core component is characterized by having a greater volumetric thermal capacity than the adsorbent (1 J/K*cc). These same type of adsorbents and characteristics also provide superior performance in hydrogen purification and syngas $H_2O$ and $CO_2$ removal. Without wishing to be bound by theory it is suggested that such core-in-shell composition improves, not only the mass transfer rate, but also the thermal management properties of the adsorbent, potentially suppressing thermal gradients in the bed during PSA cycling and thereby leading to an enhancement of the working capacity of the adsorbent bed.

SUMMARY OF THE INVENTION

The invention also relates to a superior core-in-shell adsorbent that possesses good physical strength, and can allow for a longer cycle time, thereby reducing the blow-down (vent) losses compared to known adsorbents, or a reduced adsorbent bed size. The adsorbent of the invention comprises an adsorbent shell and an inert core, wherein said core possesses a porosity less than 10%, and has a volumetric thermal capacity greater than 1 J/K*cc. The present invention also relates to an adsorber design for a vacuum/pressure swing adsorption (VSA, VPSA, PSA) process. An example is a core-shell LiX adsorbent to obtain oxygen product from air. The adsorber comprises at least two distinct adsorbent layers, wherein the first layer consists of a water or other contaminant removal layer (typically 13X or silica gel or alumina) and the second layer consists of a multi-component composite of the invention.

DETAILED DESCRIPTION OF THE FIGURES

FIG. 1 show a schematic of the composite beads-making sequence of the invention.

Figure 2:
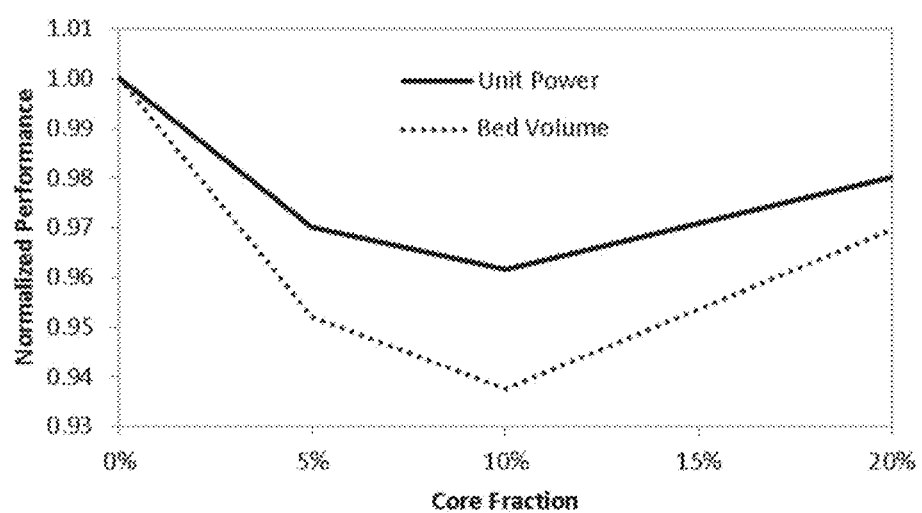

FIG. 2 of modeling results showing the relative performance gain of an alumina/bauxite core with a conventional shell, neglecting potential rate benefits.

Figure 3:
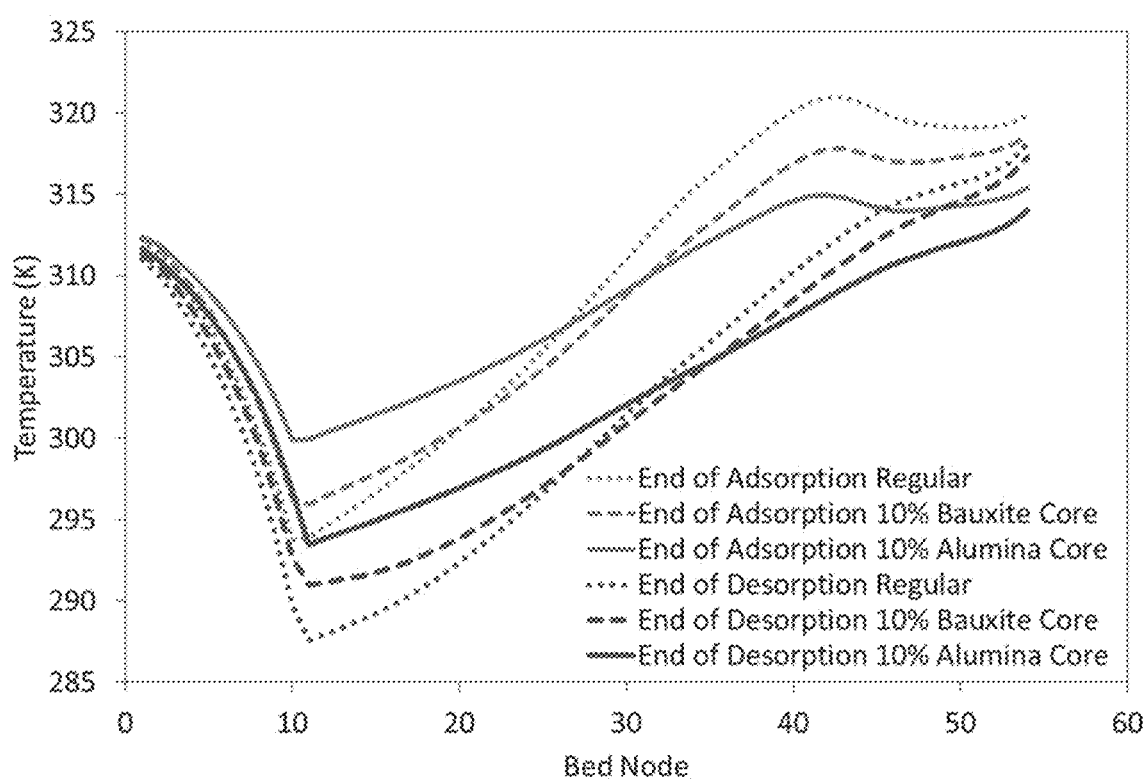

FIG. 3 of modeling results showing the effect of the core as a heat sink for a conventional shell.

Figure 4:
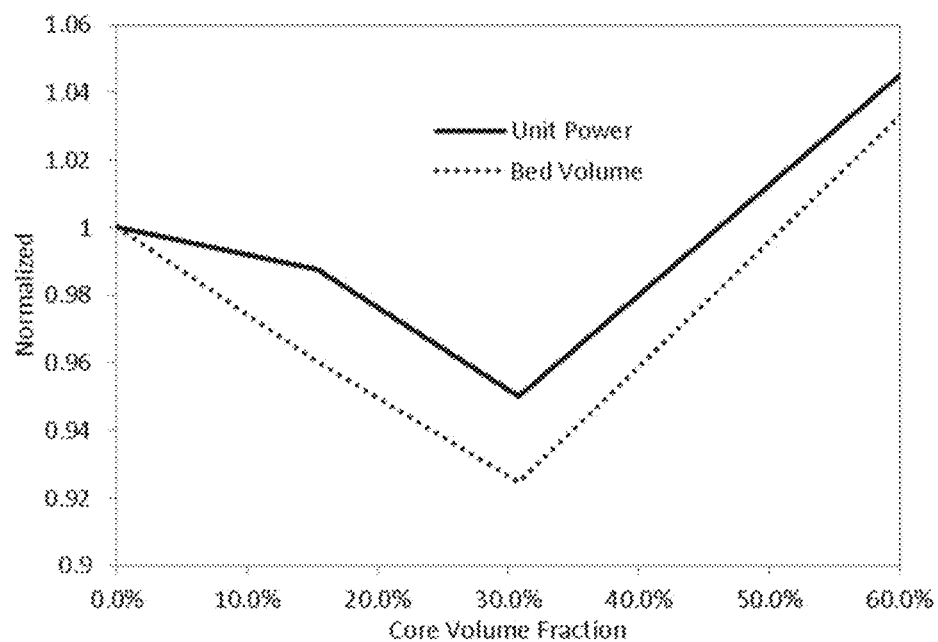

FIG. 4 of modeling results showing the effect of a bauxite core with high capacity and high rate shell.

Figure 5:
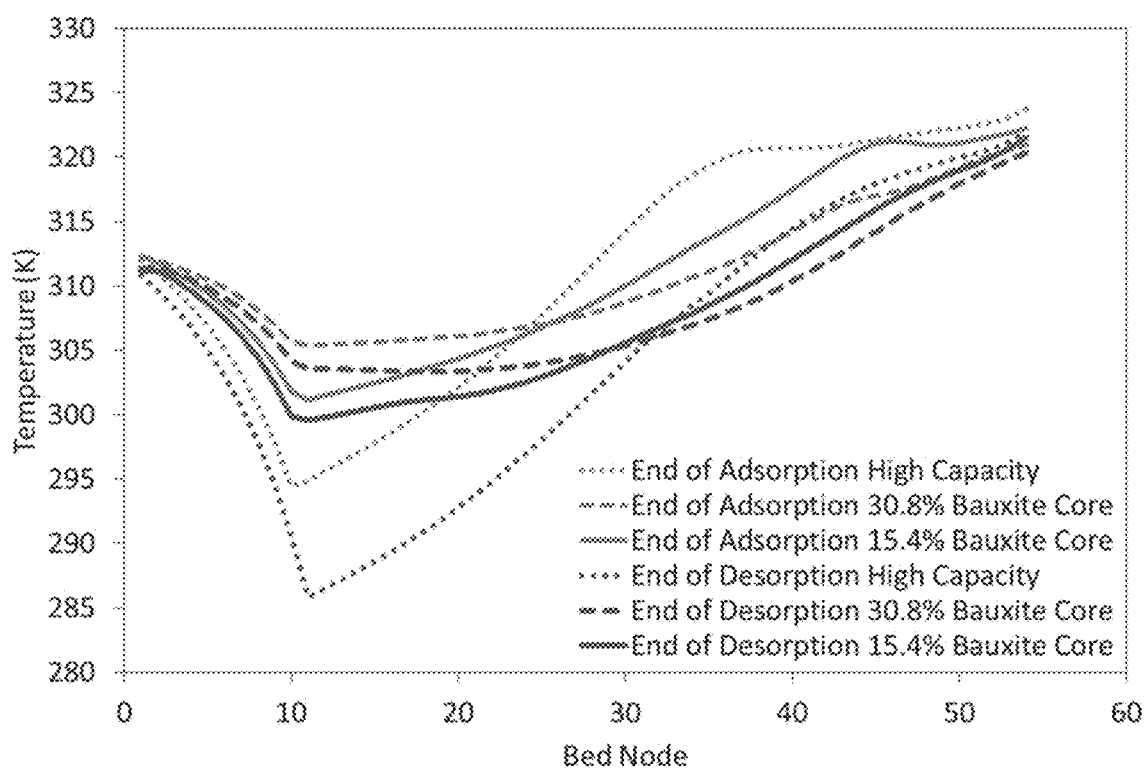

FIG. 5 of modeling results showing the thermal benefit of high volume cores with the higher capacity adsorbent.

Figure 6:
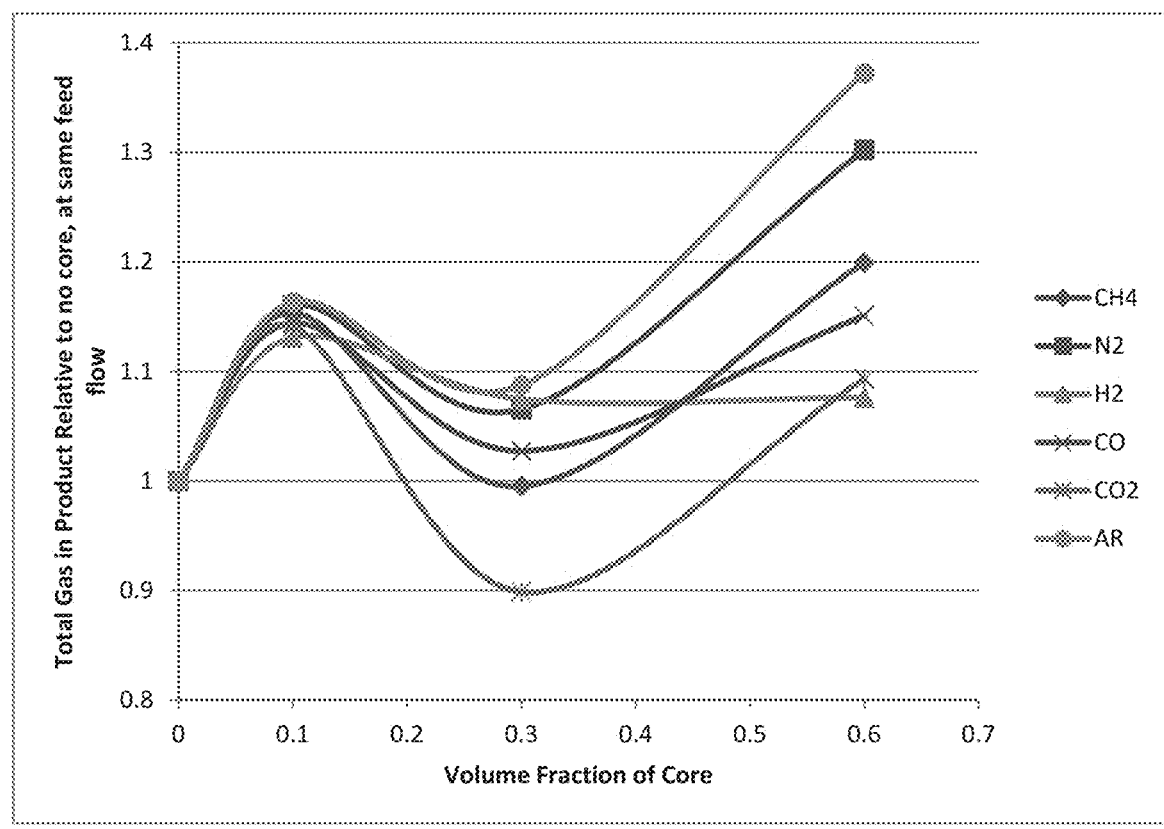

FIG. 6 of modeling results showing the thermal benefit of high volume cores with the higher capacity adsorbent for H2PSA systems and the effect on purity of product.

Figure 7:
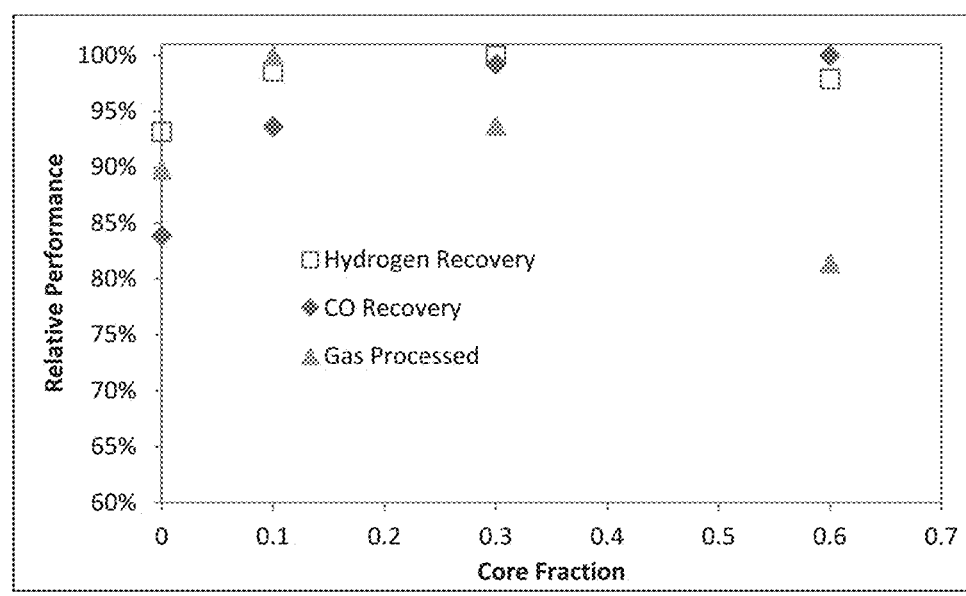

FIG. 7 of modeling results showing the thermal benefit of high volume cores with the higher capacity adsorbent for H2PSA systems and the effect on recovery and gas processed.

DETAILED DESCRIPTION OF THE INVENTION

The invention relates to a core shell composite adsorbent for use in separating bulk gases and to a process for using same. Bulk gasses are generally defined as containing greater than 1% by volume of the gas to be adsorbed. Use of a layered bed comprising a first layer of an adsorbent such as 13X or silica gel or alumina followed by a second layer of a $N_2$ selective adsorbent such as a LiX zeolite or CaX zeolite for $O_2$ VPSA/VSA/PSA systems, is generally known in the art. Use of carbon and zeolites for $H_2$PSA to remove $N_2$, $CH_4$ and CO is also known as is the use of silica gel for Syngas purifiers. The primary purpose of the first layer, located close to the feed inlet, is to remove most of the $H_2O$ in the feed, although some contaminants may also be removed by co-adsorption in the region of lower $H_2O$ loading. The purpose of the second zeolite-containing layer is to remove the bulk of the remaining contaminants. The current invention is more related to the improvement on the second or later layers of adsorbent.

The VSA/VPSA/PSA cycle typically uses two or more beds to ensure continuity of feed. In general, the steps in the cycle are as follows: (1) adsorption (feed) at high pressure and making product/providing purge, (2) equalization with the second bed, (3) countercurrent blowdown (vent) to low pressure, (4) countercurrent purge with a gas relatively free of impurities, (5) equalization up with the other bed, (6) re-pressurization to high pressure with either feed air or purified air. Thus, the regeneration of the adsorbents in a VSA/VPSA/PSA process is achieved by a combination of a simple reduction in pressure and purge with the low impurity product gas. A considerable residual loading of the impurity adsorbates remain on the adsorbents even at the end of the regeneration step. The difference between the adsorbate bed loading at the end of the feed step and that at the end of purge step is known as the dynamic loading. The dynamic loading is a function of the various operating conditions such as feed and purge pressure, temperature, purge amount and is also dependent on the selectivity and capacity of the adsorbent.

The present invention relates to a superior core-in-shell composite for an optimized VSA/VPSA/PSA bed design wherein the adsorbent specific capacity of a VSA/VPSA/PSA bed to adsorb the contaminants is significantly increased and allows the cycle time to increase. This allows the operation of a VSA/VPSA/PSA system at an increased adsorption cycle time at the same purge amount compared to the prior art. Additionally, cycle time can be extended without a major drop in allowable flow. Hence the frequency of blowdown is reduced lowering overall vent loss and compression power is significantly reduced.

The benefit of higher mass transfer rate has been well documented, while the benefit of higher heat capacity for VSA/VPSA/PSA production was also demonstrated independently by incorporating solid cores. The current invention builds on this by identifying the preferred performance in a real environment. With the surprisingly preferred range of core volume ratio of around 5-40%, the inexpensive core-shell composite significantly improves VSA/VPSA/PSA performance while exhibiting good attrition resistance and low commercial cost of manufacturing. Core volume ratio is measured by dividing the volume of the core by the volume of the final core-shell agglomerate. Both use the volume of sphere formula $(4/3)\pi r^3$. Radius was determined using average particle size as determined by sieve screens. A core volume ratio of from about 5-40% corresponds to a diameter ratio of from about 37-78%.

There are many compositions and manufacturing processes known in the art for preparation of adsorbents for air separation processes and/or for hydrocarbon processing. The predominant adsorbent forming method is pan-pelletization using an accretion disk. The challenge in the development and commercialization of advanced adsorbents is balancing the physical and adsorption characteristics. Materials that have higher rates tend to have reduced physical strength as measured by crushing strength and attrition.

The term composite is used herein to indicate that agglomerated particles contain at least one adsorbent and optionally at least one binder, coated around a non-porous inert core. Composite adsorbents are easily distinguished from adsorbent mixtures in that the above components are present within a single agglomerated particle and combined during the adsorbent manufacturing process and not physically mixed or blended together thereafter. In the present invention composite adsorbent compositions for use in VSA/VPSA/PSA processes are described wherein the adsorbent or adsorbents are selected and blended together and coated/agglomerated onto a non-porous inert core, such as bauxite or sand, and calcined to prepare composite particles.

Applicable shell compositions can be any adsorbent materials in principle including zeolites, aluminas, silicas, carbons, including activated carbons, molecular organic frameworks (MOFs) and related compositions, as well as other porous solids including transition metal substituted silicas (e.g. zincosilicates and titanosilicates) and mixtures thereof. Preferred adsorbent materials include zeolites, aluminas, silicas and carbons, including activated carbons and mixtures thereof. Particularly preferred adsorbents are zeolites, wherein the SiO2/Al2O3 ratio of the zeolite from about 1.9 to 10, and wherein the zeolite contains cations selected from H, Li, Na, K, Mg, Ca, Sr, Ba, Ag, Cu and mixtures thereof. Preferred zeolite types include Zeolite X, LSX, Y, A, L, ZSM-5, Mordenite, Clinoptilolite, Chabazite and mixtures thereof. The adsorbents forming the shell material, may be mixed with a binding agent to provide strength to the final composite adsorbent, after setting the binding agent. Suitable binding agents include, but are not limited to clay types and their mixtures, silica and silicone-derived binding agents and alumina and mixtures thereof.

The composite adsorbent of the invention generally comprises the following components in the ratios specified below:

60-95 vol % adsorbent shell.

1-20 wt %, in another embodiment 2-12wt % and in another embodiment 3-7% of a binder together with one or more of the adsorbents described above as part of the adsorbent shell during the agglomeration process.

0-5 wt %, in another embodiment 1-3 wt %, of a coating aid, as blended together with the adsorbent or adsorbents during the agglomeration as part of the adsorbent shell.

5-40 vol %, in another embodiment 5-30 vol %, 8-25% core volumetric ratio, of an inert core having extremely low porosity and a greater volumetric thermal capacity than the adsorbent or adsorbents, in one embodiment the porosity being less than 10%, in another embodiment less than 5%; and a volumetric thermal capacity higher than 1 J/cc-K, in another embodiment ≥4 J/cc K) to obtain the critical balance among performance, adsorbed capacity, heat capacity and strength.

0.4-4.0 mm composite product particle size, preferably the same or larger than as used for the conventional VSA/VPSA/PSA process.

Less than or equal to 5 wt %, in another embodiment ≤1 wt %, and in yet another embodiment ≤0.5 wt % attrition loss of the core-in-shell composite product to ensure good physical strength.

1-20% higher VSA/VPSA/PSA working capacity measured in the term of cyclic bed-size-factor, achieved with such core-in-shell composite as compared to the adsorbent or adsorbents, prepared at equivalent binding agent content as the shell, described above, and prepared at the same average particle size, without the core co-present. The improvement in working capacity is based on modeling data comparing the adsorbents of the invention to adsorbents having a volume ratio of 0% (no core) to a volume ratio of greater than 5%.

One of the particularly preferred adsorbents comprises a zeolite. In one preferred embodiment the composite adsorbent of the invention comprises the following components in the ratios specified below:

75-95 vol % adsorbent shell, wherein shell contains zeolite, carbon or silica adsorbent and a binding agent.

0-20 wt %, in another embodiment 2-12 wt % and in another embodiment 3-7% of a binder together with the zeolite as part of the adsorbent shell.

5-25 vol % of an inert core, and preferably 8-15 vol % of an inert core, having porosity less than 10% and a volumetric thermal capacity greater than 1 J/cc-K and preferably greater than 4 J/cc-K.

0.4-2.5 mm composite product particle size.

Less than or equal to 2 wt % and preferably less than or equal to 1 wt % and more preferably less than or equal to 0.5 wt % attrition loss as measured on the final core-in-shell product.

The composites of the invention are suitable for use in any bulk VSA/VPSA/PSA production process. A preferred adsorber design for an oxygen production system is a two to three layer system wherein a desiccant, preferably 13X, is positioned at the feed end of the bed and is designed to remove substantially all of the incoming moisture. Thereafter the new composite adsorbent is positioned as a second discrete layer and as shown herein can remove the $N_2$ more effectively. A third layer can be obtained by splitting the second layer by size with larger particles at the feed end, and smaller particles at the product end.

The choice of zeolite type for effective air separation is preferably from the Faujasite group and especially zeolites X and Y. A particularly preferred zeolite composition for air separation by the VSA/VPSA/PSA method is, zeolite X having $SiO_2/Al_2O_3$ less than or equal to 2.5 and including the low silica X (or $SiO_2/Al_2O_3=2.0$) grade. The zeolite X typically contains either Na, Ca or Li charge balancing cations and/or mixtures thereof. For the air separation process, described above, a particularly preferred cation type is Li, wherein the extent of Li exchange is greater than or equal to 90% and more preferably greater than or equal to 95% on an equivalents basis. By such core-in-shell configuration as described above, both mass transfer rate and heat capacity are significantly improved. The amount of zeolite in the shell of the composite of the invention generally ranges from about 75-98 vol %; in another embodiment from about 80-95 vol %; and in yet another embodiment from about 85-95 vol %.

Another of the preferred adsorbents is an activated carbon. The activated carbon core-in-shell composite materials can be used in hydrogen separations using PSA unit operations. Activated carbon coatings which represent a family of porous, largely amorphous carbonaceous material that provide a large internal surface area >100 m2/gm measured by standard methods such as nitrogen BET that provide high adsorption capacity for components present in crude hydrogen streams. These porous amorphous carbons can be generated using thermal activation processes from precursors such as coconut shell, coal, wood, and polymers. For the purposes of core-shell adsorbents, the carbon coating can be applied using an activated carbon powder or by applying a coating of precursor and carbonizing in a subsequent step. Core-shell adsorbents using activated carbon powder precursors are preferred, since it reduces the challenges associated with high temperature thermal processing and offers higher density coatings which are desirable.

Another of the preferred adsorbents is silica gel. The silica gel core-in-shell composite materials can be used in syngas purification using PSA unit operations. Silica gel represents a family of porous, largely amorphous silica materials that provide a large internal surface area >100 m2/gm measured by standard methods such as nitrogen BET that provide high adsorption capacity for components present in crude syngas streams. For the purposes of core-shell adsorbents, the silica coating can be applied using a silica gel powder.

In terms of binder selection for the inorganic adsorbents, including zeolites, silicas, aluminas, the binder is preferably selected from the group that includes, but is not limited to, clays, aluminas, silicas, silicone derived and alumina-silica reagents including hydroxides that can be used which upon calcination become alumina-silica and help give the product composite adsorbents sufficient physical strength for use. For the organic adsorbents and./or adsorbents which require calcination at temperatures of 350° C. or lower, preferred binding agents include, pitch and tar based binders, polymeric organic compounds, including celluloses, polyvinyl alcohol and related compounds and their mixtures. The compositional range for the binder has been determined based on that which provides the required crush strength and/or attrition resistance for use. The amount of binder in the composite of the invention is generally in the range of from about 2 to about 12 wt %; in another embodiment from about 3 to about 7 wt %. The preferred compositional range for the binder has been determined based on the required attrition resistance for use in cyclic adsorption processes.

Various binding agents/coating aids are known in art can be usefully employed in the context of the invention. In one embodiment, polyvinyl alcohol and/or methylcellulose can usefully be employed as a binding agent/coating aid.

The inert core of the present invention can generally have an overall porosity of greater than zero, but less than or equal to about 10%, in another embodiment less than or equal to about 5%, in another embodiment less than or equal to about 2%. Porosity is defined as the non-solid or pore-volume fraction, i.e., pore volume/total volume. Since porosity is a volume ratio it is dimensionless and typically reported as a fraction or percent. Porosity can be measured by the well-known Hg Porosimetry method (see for example chapter 4 in "Analytical Methods in Fine Particle Technology" by P. A. Webb and C. Orr, 1997 First Edition, Second Printing ISBN 0-9656783-0-X), Preferred low porosity dense core materials include, but are not limited to dense ceramics, sand, bauxite, cordierite, analcite, hematite, magnetite, granite, marble, dolomitic limestone, shale, etc. In one embodiment preferred cores are bauxite.

The inert core of the composite of the invention is also selected based on its volumetric thermal capacity, in order to manage the thermal gradients which are known to exist within an adsorbent bed. Without wishing to be bound by theory, it is believed that the performance improvements to the adsorption process, and more specifically to the VSA/VPSA/PSA performance, can be achieved by selection of such inert and non-porous cores with heat capacity values of greater than 0.8 J/cc-° K (the volumetric heat capacity of the adsorbent) and volumetric ratio of core to shell from about 5 to about 40% of the final composite bead. With higher heat capacity values than typical in homogeneous conventional composite, the current new core-in-shell adsorbents can manage the adverse temperature gradients that are generated upon adsorption and desorption respectively, compared to prior art compositions. Unlike prior art, we recognize here that over addition of this core reduces the adsorption capacity of this material beyond the increase in capacity made possible by managing the thermal gradients. As a result, it is desirable to use as high of a volumetric heat capacity material as possible, without replacing too much adsorbent, as well as using sufficient binding agent, as taught herein, to provide sufficient physical strength for use, and to maximize dynamic working capacity of the material. The heat capacity of the material should be determined using standard references at conditions of operational use. The National Institute of Standards is an example of one such reference. If the core material is a composite, the heat capacity should be calculated according to generally accepted practice. The typical temperatures for operational use of interest are 200K to 500K.

Further, suitable cores should not have exceptional density. Density is defined as the mass per volume of a substance and is typically expressed as $g/cm^3$ or $kg/m^3$. As density increases, the cost to process during manufacture of the material as well as the cost to ship, the loading cost of the adsorbent in the vessels and the vessel structural cost increase. This begins to offset the benefit of higher recovery, and can eventually be substituted by other options to increase recovery at the expense of cost. The preferred core will have a density of less than about 6 g/cc; in another embodiment less than about 5g/cc.

TABLE 1

Material Volumetric Heat Capacity (J/cc-° K)

| Materials | Heat Capacity (J/g-° K) | Density (g/cc) | Volumetric Heat Capacity (J/cc-° K) |
|---|---|---|---|
| $Al_2O_3$ | 0.88 | 3.7 | 3.2 |
| Aluminum | 0.90 | 2.7 | 2.4 |
| Bismuth | 0.12 | 9.8 | 1.2 |
| Brass | 0.38 | 8.5 | 3.2 |
| Copper | 0.39 | 9.0 | 3.5 |
| Glass | 0.84 | 2.5 | 2.1 |
| Granite | 0.79 | 2.8 | 2.2 |
| Hematite ($Fe_2O_3$) | 0.65 | 5.7 | 3.7 |
| Iron | 0.45 | 7.9 | 3.5 |
| Lead | 0.13 | 11.4 | 1.5 |
| SiO2 | 0.75 | 2.3 | 1.7 |
| Steel | 0.50 | 8.05 | 4.0 |
| Tungsten | 0.13 | 19.3 | 2.6 |
| Zinc | 0.39 | 7.1 | 2.8 |

This table is a sample of data obtained from the National Institute of Standards.

Preferred forms for the composite adsorbents described herein are not limiting and include beads, pellets, extrudates and the like. However beads are most preferred. In terms of preferred particle sizes, those that give acceptable pressure drop in a VSA/VPSA/PSA system are acceptable, for example particles in the 8×30 US mesh size range are typical for many designs.

The specific examples provided herein are for LiX zeolite with clay binder and LiX zeolite with silica binder coated on non-porous bauxite composite adsorbents; however, the teachings are applicable to any such adsorbent recipe and manufacturing for other applications, such as $H_2O_2/CO/H_2$ separation for CO and/or $H_2$ production, etc.

The composite bead-making process used as an example of a suitable forming process can be described with reference to FIG. 1. The organic binding agent, such as polyvinyl alcohol (PVA), used as a coating aid for this zeolite formulation and is preferably blended with the zeolite and clay components during either the dry mixing (as shown) or in the wet mix stage. Generally, 0.5-2 wt % of coating additive is sufficient. The agglomeration stage is carried out after suitable amount of water added on pre-screened dense sand core, with above adsorbent component added through a prolonged wet mixing step. The agglomeration method is not limiting and can be modified in manner known to those skilled in the art, including using rotating equipment such as a pan granulator or accretion wheel.

For the examples and comparative examples described below, the following generalized method of making was employed.

Step 1: Measure and mix zeolite NaX2.0 and actigel clay powders (provided by Zeochem LLC) or IE2404 silica binder (provided by Zeochem LLC), as well as the corresponding amount of PVA solution (from Sigma Aldrich) as coating aid (dry weight basis versus zeolite-binder mixture); Dry mix all the above in a Hobart mixer for approximately 1 hour.

Step 2: Pre-screen the core particles to the desired particle size, ranging in this example from 0.6 mm to 0.8 mm, load appropriate amount of such cores into the bead forming machine, which in this example was an accretion wheel. Spray water, at same time gradually add the above powder mixture, while the wheel rotates at steady speed. Grow the beads by continuing such for approximately 30 to 45 minutes.

Step 3: Dry and calcine the green beads in a dry air flow up to 593° C. for approximately 2 hours using methods known in the art. For activated carbon and/or other adsorbents that may be flammable in air at elevated temperatures, air may be substituted with nitrogen or other inert gas.

Mercury (Hg) porosimetry measurements to determine the intra-particle void volume and adsorbent porosity were performed using a Micromeritics AutoPore IV instrument. Approximately, 1 g of sample was used for each measurement. The contact angle was fixed at 135° and intrusion and extrusion data were recorded over the pressure range from 0.5 psia to 61,000 psia.

Attrition was typically measured using a single layer of finished product beads, around 50 g on dry basis. The pre-screened beads, typically of 10×20 mesh sizes, were then shaken at a steady rate in a shaker for 5 minutes. The weight of those beads passing through the screen of one mesh size smaller than the smallest product beads, 10 mesh typically, was then calculated and attributed as the attrition loss.

Sample density was measured with a pre-weighed amount of product beads loaded in a volumeter, tapped in the machine 1000 times, before the final volume is recorded with the packing density by weight divided by the volume.

$N_2$ isotherms were measured using Micromeritics ASAP 2050 instruments, with each sample pre-activated in-situ at 350° C. for 2 hours. The amount of $N_2$ adsorption at 760 torr and 25° C. was then recorded as $N_2$ capacity for each sample. The cores were also measured with $CO_2$ isotherms, and except for one specific example using porous activated alumina as reference, all non-porous cores tested, such as the bauxite, sand, etc., showed near zero $CO_2$ capacity, thus deemed non-adsorptive. $CO_2$ was used in conjunction with another filing and since $CO_2$ adsorbs significantly more strongly than $N_2$ in all typical adsorbents, no $CO_2$ adsorption was taken as an indication of no $N_2$ adsorption. Rate tests for the air separation adsorbents were performed using the Low Dead Volume Test (LDVT) method. This method is described in detail in U.S. Pat. Nos. 6,500,234 and 8,123,835. From these rate tests Mass Transfer Time (MTT) is derived which measures adsorption kinetics and the definition can be found in the US patents cited above.

The volume percentage of core in the bead can be calculated with the estimated average particle size of the core, vs. the final product. However, due to the irregular shape of some cores, such as natural sand etc., the actual core volume percentage in the bead was calculated with the measured $N_2$ capacity of each core-in-shell product, as extrapolating from references of both active shell and inert core, respectively. It was observed that occasionally the product contained shell with no core and some product had more than one core, but these anomalies typically represented less than 10% of the final product. These anomalies did not significantly affect the volume percentage.

In order to test the performance of the adsorbents under conditions which are representative of those experienced by the composite adsorbent in a VSA/VPSA/PSA $O_2$ system, we have designed a lab scale pilot test system that measures the performance of the adsorbent under VSA/VPSA/PSA cycling. The lab scale system is essentially a small commercial system for $O_2$ production running a 10-step cycle: (1) Feed and product pressurization (2) Product make (3) Product make and purge (4) Equalization down (5) Equalization down and overlap vacuum (6) Evacuate (7) Evacuate (8) Evacuate and receive purge (9) Equalize up and overlap vacuum (10) Equalize up and feed product. The test parameters are set to reflect VSA/VPSA/PSA $O_2$ operation after applying an appropriate scaling factor to account for the small size of the lab adsorption bed. Two important parameters are used to evaluate the material productivity, where productivity is a measure of the amount of $O_2$ which can be generated with the adsorbent being tested under the VSA/VPSA/PSA conditions, namely the product gas flow rate and power consumption. The higher the product gas flow the higher the productivity of the adsorbent and lower power consumption through reduced high and low pressure requirements, the more efficient the adsorbent.

Additionally a pilot scale system was built to demonstrate the benefits. This included a 40" transfer length bed with dimensions approximating those of an equivalent radial vessel, equalization header and valves, as well as feed header and valves, product header and valves and vacuum header and valves with a variable speed vacuum pump.

The above-described VSA/VPSA/PSA cycle was repeated continuously more than 250 times or until stabilization. The adsorbent performance (productivity) was described as bed-size-factor (BSF), calculated as the total weight of the adsorbent per amount of product gas flow rate ($O_2$ with a purity at 90% or greater).

The invention will now be illustrated by the following non-limiting examples.

EXAMPLE 1

Silica Binder Type Forming Example. SRS 1827 (5% Binder, 0.7 mm Bauxite Core)

42.0 lbs. of zeolite NaKLSX powder on a dry weight basis (58.0 lbs. wet weight) was placed in a Littleford LS-150 plow mixer. Thereafter with the mixer agitating, a pre-mixed combination of 6.9 lbs of 1E-2404 (a silicone containing silicone resin emulsion from Dow Corning), 1.3 lbs. 35% PVA (Optapix-35), and 1.3 lbs. water was pumped in at rate of 0.7 lb/min. At the end of the addition, plow mixing was continued for an additional 5 minutes. The plow mixed powder product labeled hereinafter "the formulation" was removed and temporarily placed in a drum. 30 lbs. of 20×30 mesh Bauxite proppants obtained from Agsco was placed in a tilted rotating drum mixer having internal working volume of ~75 L and agitated therein at a speed of 24 rpm. Slowly sprayed water while gradually adding the formulation over a 3 hour period. The product was screened to harvest those particles in the 12×16 mesh range and the product beads were air dried overnight prior to calcination. The shallow tray calcination method used a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcination. The temperature was set to 90° C. followed by a 360-minute dwell time. The temperature was then increased to 200° C. gradually over the course of a 360-minute period (approximate ramp rate=0.31° C./min), and then further increased to 300° C. over a 120-minute period (approximate ramp rate=0.83° C./min) and finally increased to 593° C. over a 180-minute period (approximate ramp rate=1.63° C./min) and held there for 45 minutes before cooling. The calcined beads were subjected to a rescreening operation to harvest those particles in the 12×16 mesh size range. The calcined beads were subjected to further processing known in the art including steps of hydration, Li ion exchange and activation up to 450° C. under dry air purge. Li exchange of the samples (to an Li exchange level of at least 96% Li on an equivalents basis) was achieved using the following procedure: A column ion exchange process was used where the samples are packed inside a glass column (dimensions:

3-inch i.d.) contacted with lithium chloride solution (1.0 M) at 90° C. at a flow rate of 15 ml/min. A preheating zone before the adsorbent packed column, ensures the solution temperature has reached the target value prior to contacting the zeolite samples. A 12-fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 50 L, a flow rate of 80 ml/min and a temperature of 90° C. was used. An AgNO$_3$ test, familiar to those skilled in the art, was used to verify that the effluent was essentially chloride free, at the end of the washing stage. The wet samples were air dried overnight then screened to harvest those particles in the 12×16 mesh prior to activation. The shallow tray activation method used a General Signal Company Blue M Electric oven equipped with a dry air purge. The adsorbents were spread out in stainless steel mesh trays to provide a thin layer less than 0.5 inch deep. A purge of 200 SCFH of dry air was fed to the oven during calcination. The temperature was set to 90° C. followed by a 360-minute dwell time. The temperature was then increased to 200° C. gradually over the course of a 360-minute period (approximate ramp rate=0.31° C./min), and then further increased to 450° C. over a 180-minute period (approximate ramp rate=1.39° C./min) and held there for 180 minutes before bottling hot.

EXAMPLE 2

Clay Binder Type Forming Example

Clay binder showed equal testing results—Isotherms, Strength, Mercury, LDVT 17894-30L (10% binder, 0.7 mm Bauxite core).
3269 gr. of zeolite NaKLSX powder on a dry weight basis (4240 gr. wet weight) was placed in a Muller mixer, together with 363g dry weight Actigel clay powder, followed by mixing for 1 hour. Slowly added 311.3 g 35% PVA (Optapix-35) diluted in 1620 gr. water at a rate of 30 ml/min. At the end of the addition, mixing was continued for 1 hour. 600 gr. of 20×30 mesh Bauxite proppants obtained from Agsco was placed in a small revolving pan (18" dia.) and agitated therein at a speed of 24 rpm. Slowly sprayed water while adding 1200 g net weight of the powder formulation until sufficient quantity of 1.5 mm beads formed. The product beads were air dried overnight prior to calcination, then calcined using the shallow tray method at temperatures up to 593° C., described in Example 2. The calcined beads were subjected to a screening operation to determine the yield and harvest those particles in the 12×16 mesh size range for further processing known in the art including steps of hydration, Li ion exchange and activation up to 593° C. under dry air purge, Li exchange of the samples (to an Li exchange level of at least 96% Li on an equivalents basis) was achieved using the following procedure: A column ion exchange process was used where the samples are packed inside a glass column (dimensions: 2-inch i.d.) contacted with lithium chloride solution (1.0 M) at 90° C. at a flow rate of 15 ml/min. A preheating zone before the adsorbent packed column, ensures the solution temperature has reached the target value prior to contacting the zeolite samples. A 12-fold excess of solution was contacted with the samples to yield products with Li contents of at least 96% exchange and above. After the required amount of solution is pumped through the column containing the samples, the feed is switched to de-ionized water to remove excess LiCl from the samples. A water volume of 20 L, a flow rate of 80 ml/min and a temperature of 90° C. was used. An AgNO$_3$ test, familiar to those skilled in the art, was used to verify that the effluent was essentially chloride free, at the end of the washing stage. The wet samples were dried and activated under dry Air purge (flow rate 200 SCFH) using the same procedure as the shallow tray activation method described in Example 2 in a General Signal Company Blue M electric oven.

TABLE 2

| Material | Calculated core/bead ratio by volume % | Measured porosity % | Calculated porosity of zeolite portion % | N2 capacity 1 atm 27 C. mmole/g | MTT sec. | Skeletal density g/cc | MPD um | Attrition % |
|---|---|---|---|---|---|---|---|---|
| Example 1 | 15.7 | 34.2 | 40.2 | 0.666 | 0.75 | 1.220 | 0.86 | 4.86 |
| Example2 | 15.1 | 36.1 | 42.3 | 0.631 | 1.19 | 1.247 | 0.30 | |
| Example 3 | 11.2 | 28.0 | 31.3 | 0.748 | 0.92 | 1.188 | 0.92 | 0.69 |
| Bauxite core | 100.0 | 1.7 | NA | 0.000 | NA | 3.382 | 0.19 | |
| 1.5 mm Li × 2.0 | 0.0 | 38.9 | 38.9 | 1.180 | 1.35 | 0.849 | 0.78 | |

Table 2 shows the physical characteristics measured for the example materials.

Wherein the mean core volume ratio is determined by sampling at least 10 screened adsorbent particles (where the size of the adsorbent particle is assumed to be the average) and determining the average number of cores per adsorbent, then using the average core size used in the manufacture of said adsorbent to calculate the volume of said adsorbent particle.

Average particle size is determined using a standard screening analysis method using 100 g of calcined material in a Ro-tap® Sieve Shaker model RX-29 equipped with 8" diameter U.S. Standard mesh screens using 15 minutes of agitation.

Percent attrition is determined as the amount of product passing a U.S. Standard 25 mesh screen after 15 minutes of agitation using 100 g calcined material prescreened to greater than 25 mesh in a Ro-tap® Sieve Shaker model RX-29 equipped with 8" diameter screens.

Table 3 showing the performance gain in the pilot plant.

| Material | Binder | Core fraction | Power | Production |
|---|---|---|---|---|
| Commercial | Silica | 0.0% | 100.0% | 100.0% |
| Example 1 | Silica | 15.4% | 95.9% | 106.1% |

EXAMPLE 3

LiLSX with Silica Binder, Commercial Preparation. 18030-23AL (5% binder, 0.7 mm bauxite core) 800 lbs. of zeolite LiLSX powder on a dry weight basis (1111 lbs. wet weight) was added to a Littleford FKM-2000-D Ploughshare® mixer. With the mixer agitating, 83.1 lbs. MR-2404 (a silicone containing silicone resin from Dow Corning) was pumped in at a rate of 4.2 lbs./min. The mixed powder product labeled hereinafter "the formulation" was transferred to a rotating pan granulation wheel. 600 lbs. of 20×30 mesh Bauxite proppants obtained from Agsco was placed in a rotating pan granulation wheel. The formulation was added to the proppants under constant rotation of the pan granulation wheel. During this time water was added through a spray nozzle to promote particle agglomeration. The formulation addition and water addition was continued under constant rotation of the pan granulation wheel until beads including those in the target 12×16 mesh size range had formed. The beads having the target 12×16 mesh size were harvested by a screening process and a representative sample of the product beads were air dried overnight prior to calcination using the shallow tray method at temperatures up to 593° C., as described in Example 1, and bottled hot.

EXAMPLE 4

Varying Core Volumes Demonstrated Via Modeling

Modeling results shown in FIG. 2 demonstrate an increase in performance with core size at 10% over 5% and a decrease in performance for a core size of 20%. The effect of the core on the reduction in variation of the temperature profile of the adsorbent bed during the cycle shows the strong benefit associated with the heat effects of the core. As shown in FIG. 3, pure alumina (sapphire) has significantly higher heat capacity than the impure bauxite and the effect can be seen in the figure provided. Here we show that the benefits a solid pure alumina core do not outweigh the cost which is why some impurities must be present for the current invention.

Modeling results shown in FIG. 4 demonstrate an increase in performance with core size at 15.4% (material properties as synthesized) and an unexpected decrease in performance at 30.8% with extrapolated properties (which derive from higher extrapolated rate performance). This trend was reversed at 40% and at 60% the performance was worse than without the core. These results are in direct contradiction with previous teachings and demonstrate that even with the rate benefit of larger cores it is still balanced with the loss of capacity through loss of adsorption sites. Without wishing to be bound to a particular theory, the performance at 30.8% may be explained by the higher capacity of the shell material and lowered heat capacity therein, as shown in FIG. 5. Due to the higher capacity, more heat is generated upon adsorption and more heat is required for desorption. This is supported by the trends observed in the temperature profiles of the adsorbent bed in the model.

Compared directly to Brandt et al. results which teach a core shell composite at 50% to 80% by volume, we have found that this range does not actually infer a benefit to bulk separation processes. A range that has a smaller composite % has superior performance, despite having lower rate and heat capacity benefits of the core. Without wishing to be bound to any particular theory we can see that this might result from the parasitic void losses in the bed. If we reduce the amount of zeolite in the bed by 50%, the parasitic void losses rise substantially, ~400% for a typical $O_2$ VPSA process.

Specifically, for the Brandt et al. method of volume based performance, Brandt et al. found consistently lower volume based performance. Our material created here is consistently higher volume based performance, showing that surprisingly, lower core volume correlates with higher volume averaged performance.

EXAMPLE 5

H2PSA—For a Methanol Recycle $H_2$ Recovery PSA System

Core fraction in the carbon layer of a $H_2$PSA system, for a methanol recycle loop $H_2$ recovery system. As shown in FIG. 6, recovery increased substantially for a 10% core, to roughly 113% while maintaining purity specification. At 30% core, the recovery was only 107% but substantially higher $CO_2$ was removed. At 60% core, the system was unable to maintain purity spec within reasonable operation limits, as a higher reduction in flow rate significantly changes the cycle required to operate.

In this particular model, the rate of adsorption was varied up to 300% higher, with no change in adsorbent performance. Compared with the Gerds et al. teachings of porous cores (which do not impart a heat capacity benefit, only a rate benefit) in this example we see no benefit with their invention. In fact concurrent with the findings of the $O_2$ VPSA their adsorbent has lower volumetric performance (using the Brandt et al. method) and this adsorbent has higher volumetric performance.

EXAMPLE 6

Syngas Purifier

FIG. 7 shows the benefit vs. core size. Compared with the Gerds et al. teachings of porous cores (which do not impart a heat capacity benefit, only a rate benefit, at the expense of capacity) in this example we see no benefit with their invention. Specifically with their invention the adsorbent has lower volumetric performance (as determined with the Brandt et al. method) and the adsorbent specified in this invention has higher volumetric performance.

We claim:

1. A core shell composite adsorbent for use in separating bulk gases in a cyclic adsorbent process comprising:
   from about 65-95 vol % of an adsorbent shell comprising one or more zeolites, and
   an inert core having a porosity of less than 10%
   wherein the mean core volume ratio of the adsorbent ranges from about 5 to about 35%, said inert core having a volumetric thermal capacity higher than 1 J/cc-K.

2. The composite of claim 1 having an attrition loss of less than or equal to 5 wt %.

3. The composite of claim 1 wherein said zeolite is selected from LSX, Y, A, L, ZSM-5, Mordenite, Clinoptilolite, Chabazite and mixtures thereof.

4. The composite of claim 3 wherein said zeolite has a $SiO2/Al_2O_3$ ratio of from about 1.9 to 10, and wherein the zeolite contains cations selected from H, Li, Na, K, Mg, Ca, Sr, Ba, Ag, Cu and mixtures thereof.

5. The composite of claim 4 wherein the adsorbent is LiX wherein the extent of Li exchange is greater than or equal to 90% on an equivalents basis.

6. The composite of claim 1 wherein said adsorbent shell comprises from about 1-20 wt % binder.

7. The composite of claim 6 wherein said adsorbent shell comprises from about 2-12 wt % binder.

8. The composite of claim 1 wherein said adsorbent shell comprises 0-5 wt % of at least one coating aid.

9. The composite of claim 6 wherein the binder is selected from clays, aluminas, silicas, alumina-silica reagents and hydroxides that, upon calcination become alumina-silica.

10. The composite of claim 8 wherein the coating aid is selected from polyvinyl alcohol, methylcellulose, and mixtures thereof.

11. The composite of claim 1 wherein the core volumetric ratio of the composite adsorbent is from about 8% to about 25%.

12. The composite of claim 4 wherein said core has a porosity of from about 0% to less than or equal to 5%.

13. The composite of claim 2 wherein the attrition loss of said composite is less than or equal to 2 wt %.

14. The composite of claim 1 wherein said inert core is selected from dense ceramics, sand, bauxite, cordierite, analcite, hematite, magnetite, granite, marble, dolomitic limestone, shale, and combinations thereof.

15. A cyclic gas separation process for separating at least two gaseous components having different adsorption characteristics from a gaseous mixture, said process comprising feeding a said gaseous mixture into an adsorption vessel containing the composite adsorbent of claim 1, wherein said composite adsorbent is capable of preferentially adsorbing one component of said gaseous mixture and separating same from the non-adsorbed component which passes through the adsorbent vessel as the recovered product, wherein the gaseous mixture is air and the recovered product is oxygen.

16. The process of claim 15 wherein the separation is performed by vacuum swing adsorption, vacuum pressure swing adsorption, or pressure swing adsorption.

17. The process of claim 15 wherein the separation process is a vacuum pressure swing adsorption process or a pressure swing adsorption process configured to separate oxygen from air.

* * * * *